(12) United States Patent
Zeng et al.

(10) Patent No.: US 10,911,187 B2
(45) Date of Patent: Feb. 2, 2021

(54) USER EQUIPMENT PROVISION OF ENHANCED CAPABILITY INFORMATION FOR HARQ PROCESSING

(71) Applicant: Apple Inc., Cupertino, CA (US)

(72) Inventors: Wei Zeng, San Diego, CA (US); Yuchul Kim, Santa Clara, CA (US); Dawei Zhang, Saratoga, CA (US); Christian W. Mucke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 15/920,667

(22) Filed: Mar. 14, 2018

(65) Prior Publication Data

US 2018/0278374 A1    Sep. 27, 2018

Related U.S. Application Data

(60) Provisional application No. 62/475,416, filed on Mar. 23, 2017.

(51) Int. Cl.
*H04L 1/18* (2006.01)
*H04W 72/04* (2009.01)
(Continued)

(52) U.S. Cl.
CPC .......... *H04L 1/1812* (2013.01); *H04L 1/1822* (2013.01); *H04L 1/1835* (2013.01);
(Continued)

(58) Field of Classification Search
None
See application file for complete search history.

(56) References Cited

U.S. PATENT DOCUMENTS

| 8,660,107 B2 | 2/2014 | Liao | |
|---|---|---|---|
| 2009/0040969 A1* | 2/2009 | Kim | H04W 28/06 370/328 |

(Continued)

FOREIGN PATENT DOCUMENTS

| EP | 1389847 A1 * | 2/2004 | .......... H04L 1/1822 |
|---|---|---|---|
| EP | 2 518 927 A1 | 10/2012 | |
| WO | WO 2016/173637 A1 | 11/2016 | |

OTHER PUBLICATIONS

MCC TF160; "Corrections to GCF WI-257 MAC test case 22.3.1.6": 3GPP Draft; 36523-1 CR3791 (REL-13); R5-170570; 3rd Generation Partnership Project (3GPP); Mobile Competence Centre; 650, Route Des Lucioles; F-06921 Sophia-Antipolis Cedex; France; vol. RAN WG5, No. Athens, Greece; Mar. 5, 2017; XP051233066; 12 pages.

(Continued)

*Primary Examiner* — Alpus Hsu
*Assistant Examiner* — Camquyen Thai
(74) *Attorney, Agent, or Firm* — Kowert, Hood, Munyon, Rankin & Goetzel, P.C.

(57) ABSTRACT

This disclosure relates to indicating capabilities of a user equipment to a base station while performing cellular communication. A user equipment (UE) may transmit capability information to a base station. The capability information may comprise a maximum transport block size (TBS) per transmission time interval (TTI) and an associated processing delay of the UE for a reference subcarrier spacing. Alternatively, the capability information may comprise a maximum throughput and associated processing delay of the UE. The base station may determine at least one of a maximum TBS per TTI or a number of parallel hybrid automatic repeat request (HARQ) processes to utilize in subsequent communications with the UE based on the (Continued)

capability information and a subcarrier spacing to be used for the subsequent communications.

20 Claims, 6 Drawing Sheets

(51) Int. Cl.
 *H04L 5/00* (2006.01)
 *H04W 8/24* (2009.01)
 *H04W 88/02* (2009.01)
(52) U.S. Cl.
 CPC .......... *H04L 1/1896* (2013.01); *H04L 5/0044* (2013.01); *H04W 8/24* (2013.01); *H04W 72/048* (2013.01); *H04W 72/0446* (2013.01); *H04L 5/0007* (2013.01); *H04L 5/0053* (2013.01); *H04L 5/0055* (2013.01); *H04W 88/02* (2013.01)

(56) References Cited

U.S. PATENT DOCUMENTS

| | | | |
|---|---|---|---|
| 2009/0204867 A1* | 8/2009 | Ho | ........................ H04L 1/1822 |
| | | | 714/749 |
| 2015/0326381 A1 | 11/2015 | Sakhnini et al. | |
| 2016/0323070 A1* | 11/2016 | Chen | ................. H04W 56/0045 |
| 2017/0164350 A1* | 6/2017 | Sun | ........................... H04L 5/00 |
| 2017/0265190 A1* | 9/2017 | Marjelund | ............ H04W 28/22 |
| 2017/0288819 A1 | 10/2017 | Chen et al. | |
| 2018/0206263 A1* | 7/2018 | Lin | ..................... H04W 56/003 |
| 2019/0268105 A1* | 8/2019 | Chen | ..................... H04L 1/1854 |
| 2019/0349960 A1* | 11/2019 | Li | ......................... H04L 1/1812 |

OTHER PUBLICATIONS

International Search Report and Written Opinion, Application No. PCT/US2018/023802, dated Jun. 20, 2018, 15 pages.

* cited by examiner

| UE DL Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| DL Category M1 | 1000 | 1000 | 25344 | 1 |
| DL Category 0 (Note 2) | 1000 | 1000 | 25344 | 1 |
| DL Category 6 | 301504 | 149776 (4 layers, 64QAM) 75376 (2 layers, 64QAM) | 3654144 | 2 or 4 |
| DL Category 7 | 301504 | 149776 (4 layers, 64QAM) 75376 (2 layers, 64QAM) | 3654144 | 2 or 4 |
| DL Category 9 | 452256 | 149776 (4 layers, 64QAM) 75376 (2 layers, 64QAM) | 5481216 | 2 or 4 |
| DL Category 10 | 452256 | 149776 (4 layers, 64QAM) 75376 (2 layers, 64QAM) | 5481216 | 2 or 4 |
| DL Category 11 | 603008 | 149776 (4 layers, 64QAM) 195816 (4 layers, 256QAM) 75376 (2 layers, 64QAM) 97896 (2 layers, 256QAM) | 7308288 | 2 or 4 |
| DL Category 12 | 603008 | 149776 (4 layers, 64QAM) 195816 (4 layers, 256QAM) 75376 (2 layers, 64QAM) 97896 (2 layers, 256QAM) | 7308288 | 2 or 4 |

FIG. 7

USER EQUIPMENT PROVISION OF ENHANCED CAPABILITY INFORMATION FOR HARQ PROCESSING

PRIORITY CLAIM

This application claims priority to U.S. provisional patent application Ser. No. 62/475,416, entitled "User Equipment Provision of Enhanced Capability Information for HARQ Processing," filed Mar. 23, 2017, which is hereby incorporated by reference in its entirety as though fully and completely set forth herein.

FIELD OF THE INVENTION

The present application relates to wireless communications, and more particularly to systems, apparatuses, and methods for indicating capabilities between user equipment (UE) and base stations.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY OF THE INVENTION

Embodiments are presented herein of apparatuses, systems, and methods for indicating user equipment (UE) capability to a base station in cellular communication. The UE capability information may be used by the base station to determine a maximum transport block size (TBS) per transmission time interval (TTI) and/or a maximum number of supportable parallel hybrid automatic repeat request (HARQ) processes for the UE in a subsequent HARQ procedure.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 7 is a table illustrating legacy downlink UE categories and associated UE performance metrics in LTE, according to some embodiments;

Figure 1:
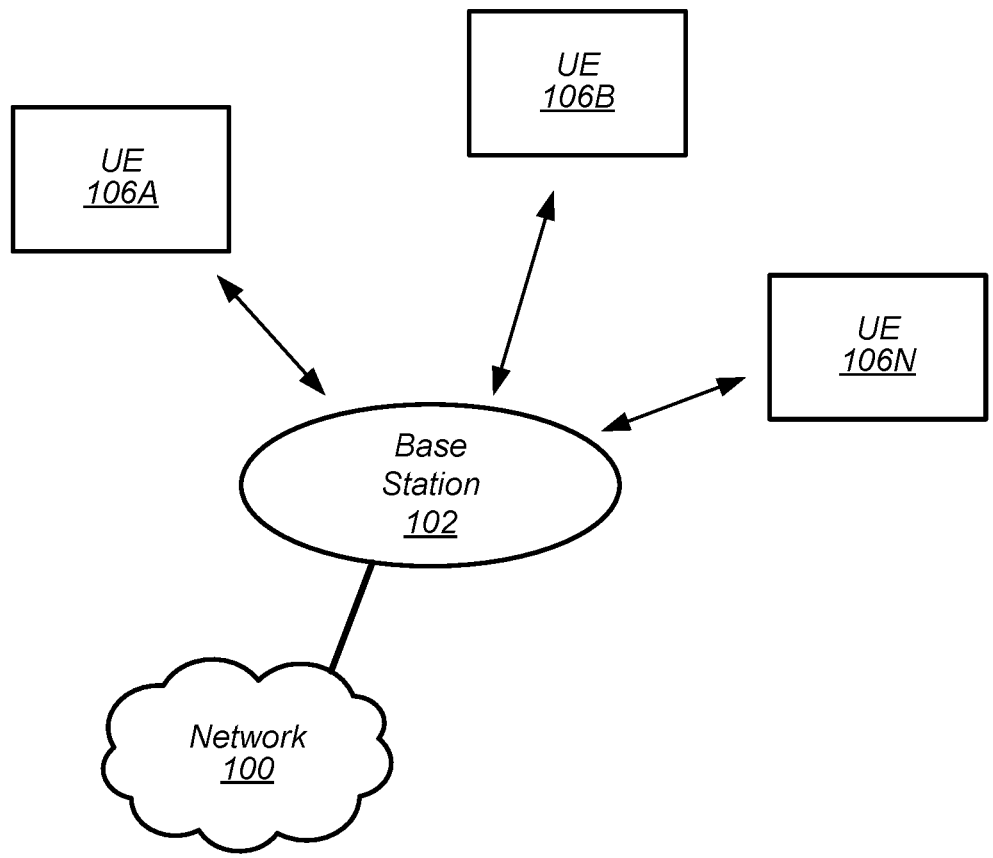
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
GSM: Global System for Mobile Communication HARQ: Hybrid Automatic Repeat Request
UMTS: Universal Mobile Telecommunication System
LTE: Long Term Evolution
NR: New Radio
Tx: Transmission/Transmit
Rx: Reception/Receive
ReTx: Retransmission/Retransmit
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards
TBS: Transport Block Size
TTI: Transmission time interval Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
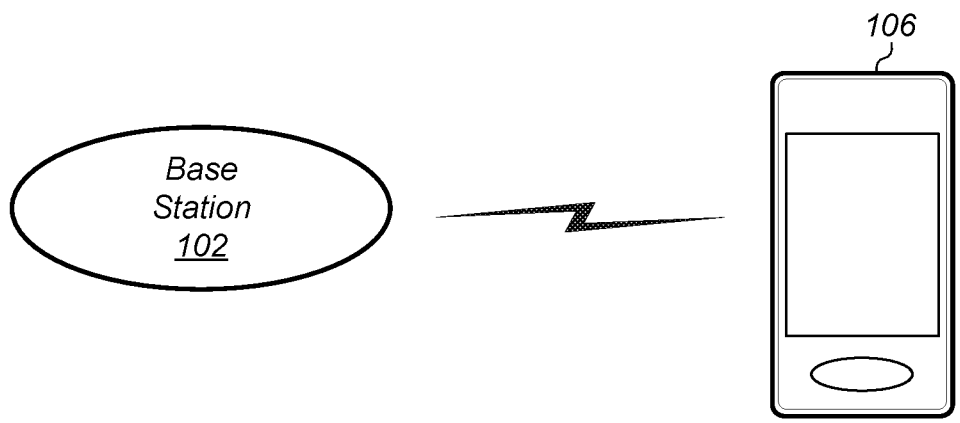
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform cellular communication using modular control channel formats for uplink control information, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM), and separate radios for communicating using each of Wi-Fi and BLUETOOTH'. Other configurations are also possible.

Figure 3:
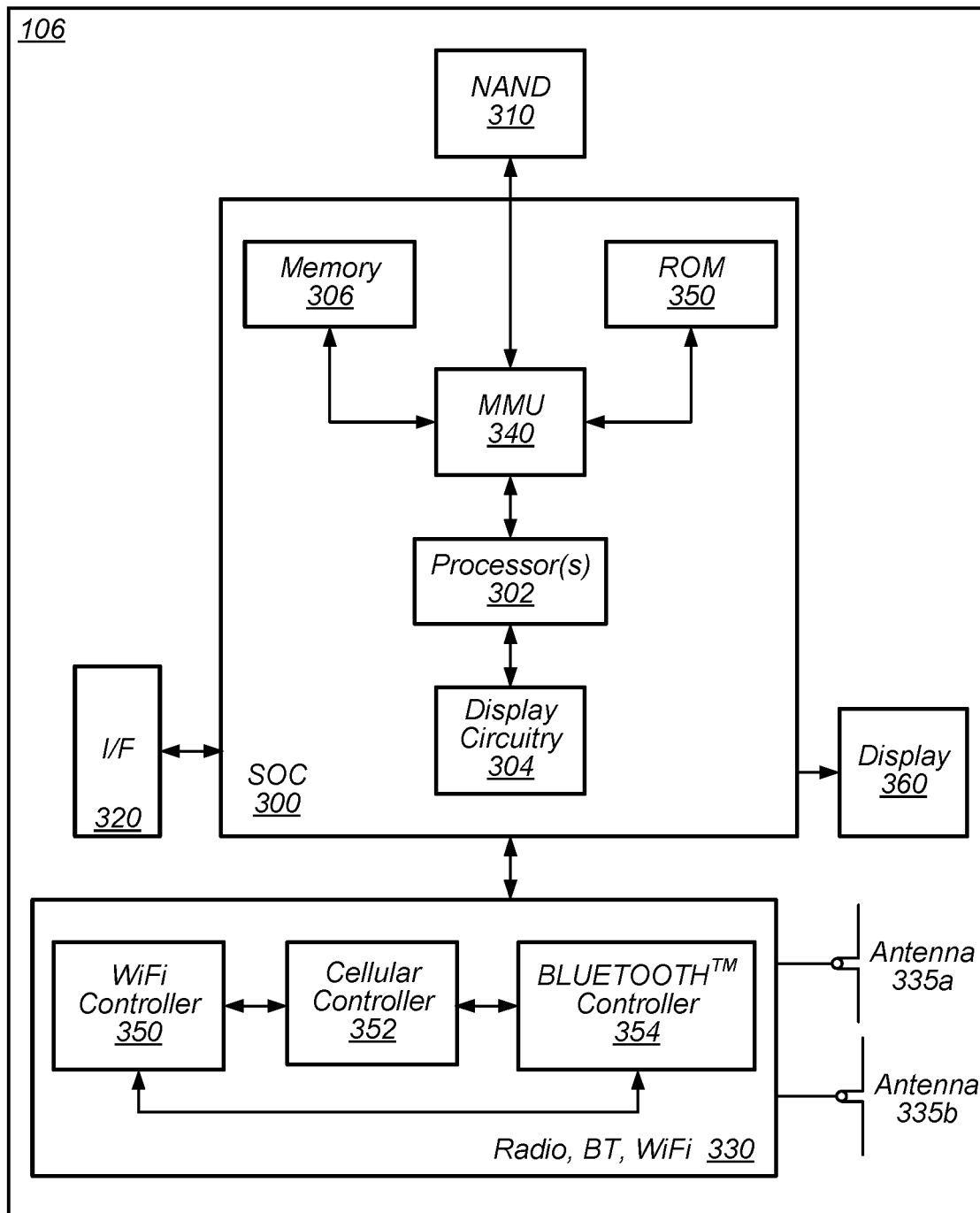
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform cellular communication using modular control channel formats for uplink control information. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform cellular communication using modular control channel formats for uplink control information according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 350, a cellular controller (e.g. NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 352 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible communication in unlicensed spectrum by the UE 106. As another possibility, the cellular controller 352 may include hardware and/or software components for generating Wi-Fi physical layer preamble signals, e.g., for transmitting as part of uplink communications by the UE 106 that occur in unlicensed frequency bands.

Figure 4:
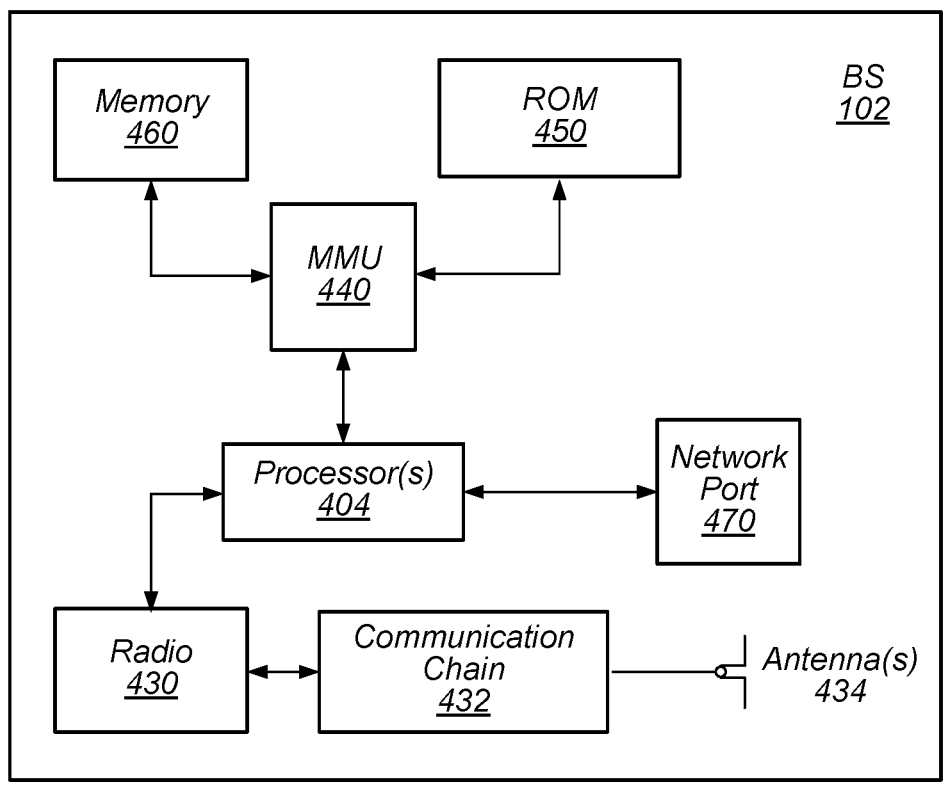
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform cellular communication using modular control channel formats for uplink control information.

Figure 5:
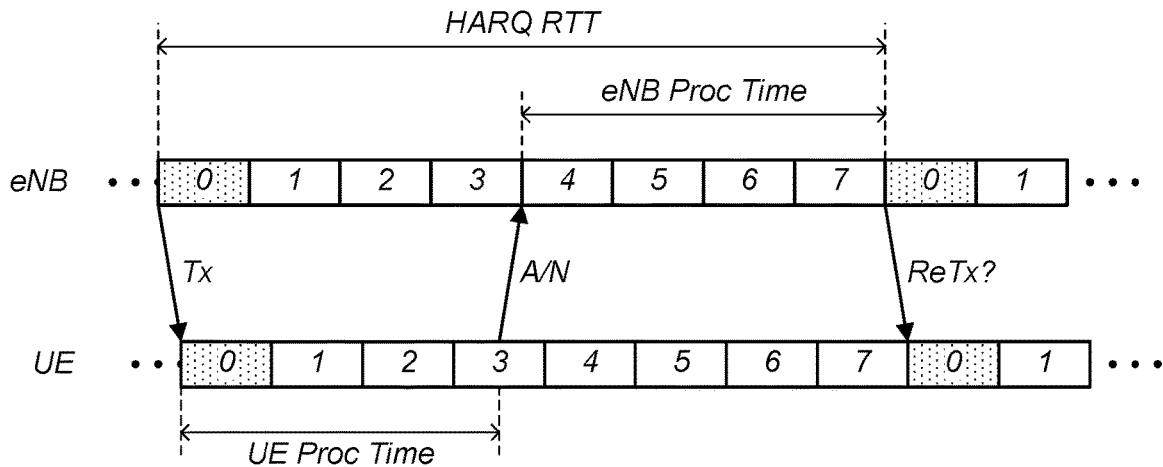
FIG. 5 is a communication flow diagram a typical HARQ procedure between a base station and a UE, according to some embodiments.

FIG. 5—Typical HARQ Procedure

Hybrid automatic repeat request (HARQ) is commonly used as an effective and efficient means for performing error correction in wireless communication. HARQ is a combination of forward error-correcting coding and standard automatic repeat request (ARQ) error-control. A standard HARQ procedure is illustrated in FIG. 5.

As shown, in some embodiments, an initial data packet may be sent from a base station to a UE in subframe 0. After a transmit time, the UE may receive the packet and then process the received packet in subframe 0. The amount of time required for the UE to process the received packet may depend on the amount of data in the packet as well as hardware capabilities of the UE (e.g., processing power and/or how efficient its pipeline processing capabilities are). After processing the packet, the UE may determine if it was able or unable to successfully decode the packet. The UE may then transmit a HARQ ACK/NACK message (denoted by A/N in FIG. 5) to the base station based on the determination. For example, the UE may send an ACK message if the decode was successful, and a NACK message if the decode was unsuccessful.

The base station may then process the received ACK/NACK message to determine whether to retransmit (ReTx) the data packet or to transmit (Tx) a new packet. Processing by the base station may comprise scheduling decisions for the UE as well as other UEs in communication with the base station. The total elapsed time from when the base station sends the initial HARQ message until it sends a ReTx/Tx message is identified in FIG. 5 as the HARQ round-trip time (RTT). In the illustrated embodiment, the combination of UE processing time, base station processing time (eNB Proc Time), and signal transit times cause the HARQ RTT to be equal to 8 subframes. For example, in LTE, a subframe may be 1 ms in duration, such that the HARQ RTT may be 8 ms in the illustrated embodiment of FIG. 5.

FIG. 5 illustrates a particular HARQ procedure that utilizes subframe 0. In typical embodiments, the UE and the base station are not idle during the intervening subframes that are not involved in this particular HARQ procedure. Rather, subframes 1-7 may be typically be utilized by the base station and/or the UE for additional parallel HARQ procedures. It may be appreciated that in the illustrated embodiment, 8 total parallel HARQ processes may be performed in subframes 0-7.

Various hardware considerations may limit the number of parallel HARQ processes that can be supported in a particular communication. For example, UE or base station processing power can determine how fast the UE or base station can process data, wherein a lower processing power may lead to longer processing time. As explained in greater detail below, a longer processing time may increase the HARQ RTT, thereby increasing the amount of time for additional subframes to perform parallel HARQ procedures. In contrast, a UE with a faster processor may have a smaller HARQ RTT, thereby supporting a smaller number of parallel HARQ procedures.

In some embodiments, a HARQ soft buffer size of the UE may determine how much memory the UE has to store unacknowledged bits. For example, in the illustrated embodiment of FIG. 5, the UE stores the HARQ message received at subframe 0 until an ReTx/Tx message is received at the subsequent subframe 0. As explained in further detail below, a smaller HARQ buffer size of the UE may limit the number of HARQ messages that the UE can simultaneously store, hence limiting the number of parallel HARQ procedures that are supported by the UE. In contrast, a larger HARQ buffer size may enable a UE to support a larger number of parallel HARQ procedures.

In some embodiments, a delay target of a particular communication may limit the number of parallel HARQ procedures. For example, an individual service may only be able to tolerate a certain level of delay without negatively impacting the user experience, and the inclusion of additional parallel HARQ procedures may serve to increase the delay experienced by the device. A different service with a less stringent delay target may operate with an acceptable delay with a larger number of parallel HARQ processes. It is expected that NR may enable services with more stringent delay targets compared to existing LTE services. Therefore, it may be desirable that NR supports a smaller number of parallel HARQ processes than 8, at least when configured with 15 kHz subcarrier spacing (SCS), as one example.

Figure 6:
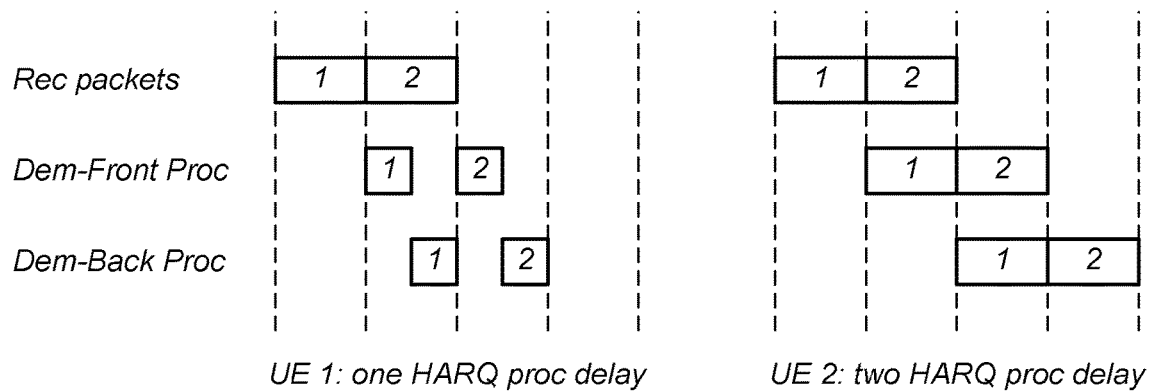
FIG. 6 illustrates the impact of processing power on HARQ processing delay for a first and second UE, according to some embodiments.

FIG. 6—UE Processing Power Impact

FIG. 6 schematically illustrates processing of received data packets by a first and second UE, as well as the associated HARQ processing delay. The embodiment illustrated in FIG. 6 assumes a simplified UE architecture with two steps: front-end processing (labelled 'Dem-front proc', or demodulation front-end processing) and back-end processing (labelled 'Dem-back proc', or demodulation back-end processing). The illustrated embodiment further assumes pipelining resolution of TTI. Other embodiments may utilize smaller pipeline resolution (e.g., per-symbol), which may lead to more efficient pipeline architecture with shorter delay.

In some embodiments, a UE with limited processing power may invoke a longer processing delay when processing received communications. A larger processing delay may in turn increase the HARQ RTT, allowing time for a larger number of HARQ processes to be simultaneously processed.

As shown, each of UE 1 and UE 2 receive a first and second data packet from a base station, labeled '1' and '2', respectively. The reception of each data packet requires an amount of time equal to one TTI length, as indicated by the vertical dashed lines. In the left diagram, UE 1 has a faster processor that is able to perform both front-end and back-end processing on a received data packet during a single TTI length. As shown, UE 1 is able to finish processing both packets 1 and 2 with an overall delay of one TTI length (i.e., one HARQ delay) after reception of the second data packet from the base station.

In contrast, in the right diagram, UE 2 has a slower processor that requires an entire TTI length to perform each of front or back end processing on a single received data packet. As a result, UE 2 invokes an overall processing delay of two TTI lengths (i.e., two HARQ delays) after reception of the second data packet from the base station before both data packets have been fully processed at the front end and the back end.

It can be appreciated that with a fixed transport block size (TBS) per TTI (i.e. same data throughput), UE 1 with faster processing speed can support a 1 HARQ processing delay, while UE 2 with slower processing speed only supports a 2 HARQ processing delay. It may be further appreciated that UE 1 may potentially be more complicated and costly than UE 2. For a fixed processing delay, higher peak throughput (bps) may require more UE processing power.

UE Soft Buffer Size Impact

With a fixed data rate, a UE with limited soft buffer size may support a smaller number of HARQ processes for a given subcarrier spacing. In general, the soft buffer size is proportional to the data rate a UE can support, as well as the supportable number of parallel HARQ processes, as follows:

$$N_{soft\text{-}bits} \propto \frac{bits}{TTI} \cdot N_{HARQ} \propto R(bps) \cdot T_{HARQ}(s) \quad (1)$$

Equation 1 shows that the number of soft-bits that will need to be stored in a soft buffer during a HARQ RTT, $N_{soft\_bits}$, (i.e., the total memory required by the UE to complete the HARQ procedure) is proportional to the number of bits per TTI in each parallel HARQ process times the number of parallel HARQ processes. Equivalently, $N_{soft\_bits}$ is also proportional to the data rate in bits per second times the duration, in seconds, of the HARQ RTT. It may be appreciated that Equation 1 expresses how the soft memory requirements of the HARQ processes may be represented either in terms of the size and number of HARQ processes, or in terms of the data rate and duration of the HARQ process. If a UE is soft buffer size limited, higher throughput may only be supported for a smaller number of HARQ processes. NR is expected to support much wider bandwidth than LTE, and the peak data rate in NR may potentially be as high as 20 Gbps to meet IMT2020 requirements. To support such a high peak throughput, it may be desirable to reduce the number of parallel HARQ processes to reduce the required amount of soft buffer. In some embodiments, a larger number of parallel HARQ processes may still need to be configured, but the UE may need to reduce the data rate accordingly.

Number of HARQ Processes in LTE and NR

LTE typically supports 8 parallel HARQ Processes in frequency-division duplexing (FDD). In many embodiments, the processing time is equally split with 4 TTI for the UE and 4 TTI for the base station. Typically, LTE employs a fixed numerology wherein 1 TTI=1 ms, and wherein the subcarrier spacing (SCS) is set to 15 kHz. A numerology is defined herein as a particular subcarrier spacing, with an associated TTI length.

To perform a HARQ procedure, a UE may need to inform the base station of its hardware capabilities so that the base station can appropriately calibrate parameters of the HARQ procedure. In existing LTE HARQ procedures, this is typically accomplished by the UE informing the base station of the UE's category. The UE category specifies UE processing power (i.e., a maximum number of DL-SCH transport block bits per TTI) and a HARQ buffer size (total number of storable soft channel bits). In existing LTE implementations, once the base station obtains knowledge of the UE category, it can determine the transport block size (TBS) that is appropriate for that UE given that there will be 8 parallel HARQ processes.

FIG. 7 is a table illustrating the information associated with various downlink categories in traditional LTE implementations. In legacy embodiments, a UE may communicate its category to the base station, whereby the base station employs a stored version of FIG. 7 to determine various performance metrics of the UE device based on the UE category.

The first column of FIG. 7 lists the names of various downlink categories.

The second column of FIG. 7 lists the maximum number of overall bits per TTI that the UE is able to process for each UE category.

The third column of FIG. 7 lists the number of bits per TTI per transport block that the UE is able to process for each UE category.

The fourth column of FIG. 7 lists the total number of soft channel bits that the UE is able to store for each UE category.

The fifth column of FIG. 7 list the maximum number of multiple-input multiple-output (MIMO) layers that the UE is able to support in DL spatial multiplexing for each UE category.

In contrast to LTE, NR is anticipated to support different numerologies, wherein subcarrier spacing other than 15 kHz are used. In particular, a scalable numerology is anticipated for NR with subcarrier spacing of 15 kHz, 30 kHz, 60 kHz, 120 kHz, 240 kHz, and 480 kHz. More generally, any subcarrier spacing of the form 15 kHz·$2^k$, for any integer k, may be supported in NR. While the embodiments described herein are applicable to these specific numerologies, the methods described may be more generally applied to any numerology and any subcarrier spacing.

Using an alternative numerology will correspondingly scale the TTI length of the HARQ processes. For example, the 15 kHz numerology used in LTE corresponds to a 1 ms TTI length, while a 30 kHz numerology in NR may correspond to a 0.5 ms TTI length, and a 60 kHz numerology in NR may correspond to a 0.25 ms TTI length, etc. For a given UE with fixed data throughput, different numerologies may translate into a different supportable maximum number of parallel HARQ processes. For example, if a particular UE is able to support 8 parallel HARQ processes with a 15 kHz SCS, it may be able to support 16 parallel HARQ processes with a 30 kHz SCS. This is understandable from a memory perspective, in that a 30 kHz SCS will have half the TTI length of a kHz SCS, so that each HARQ process will require half of the soft buffer memory requirements for a 30 kHz SCS relative to a 15 kHz SCS.

In contrast to LTE, wherein 8 parallel HARQ processes are typically supported, NR is anticipated to support different numbers of parallel HARQs. In particular, NR is anticipated to support operation of more than one DL HARQ processes for a given UE, and more than one UL HARQ processes for a given UE. NR is further anticipated to support operation of one DL HARQ process for some UEs, and one UL HARQ process for some UEs. Efficient operation of a single DL HARQ process for a particular UE would require the UE to have a faster processing time than is required for 8 parallel HARQ processes, although there would be a smaller soft buffer requirement for the operation.

In NR, for a given UE, the maximum supportable number of bits per TTI may vary depending of the number of parallel HARQ processes. For example, a smaller number of parallel HARQ processes may require the UE to have a smaller amount of soft buffer space, but may have stricter requirements for fast processing by the UE to rapidly send the ACK/NACK to the base station upon receipt of a HARQ packet. In this case, a larger number of bits per TTI may be storable by the soft buffer, but an excessively large number of bits per TTI may not satisfy the processing speed requirements, since a larger number of bits may require more time to process. For a HARQ procedure with a small number of parallel HARQ processes, the maximum supportable number of bits per TTI may be primarily determined by the processing speed.

Conversely, a large number of parallel HARQ processes may require the UE to have a large soft buffer capacity to store the data associated with each of the HARQ processes, but the UE will have more time to perform processing on each of the packets. For a HARQ procedure with a large number of parallel HARQ processes, the maximum supportable number of bits per TTI may be primarily determined by the soft buffer size.

Flexibility of the base station in NR to adjust the number of parallel HARQ processes may allow the base station to optimize the balance between buffer size and processing speed based on hardware capabilities of the UE and the base station, according to some embodiments.

Because of the increased flexibility for numerology (e.g., flexibility in the SCS) and the number of parallel HARQ processes in NR, the definition of a UE category may be significantly more complex in NR than in LTE. It is thus a more complex problem for the UE to effectively and efficiently communicate its HARQ capabilities to the base station. Embodiments presented below propose several potential solutions to this problem.

Figure 8:
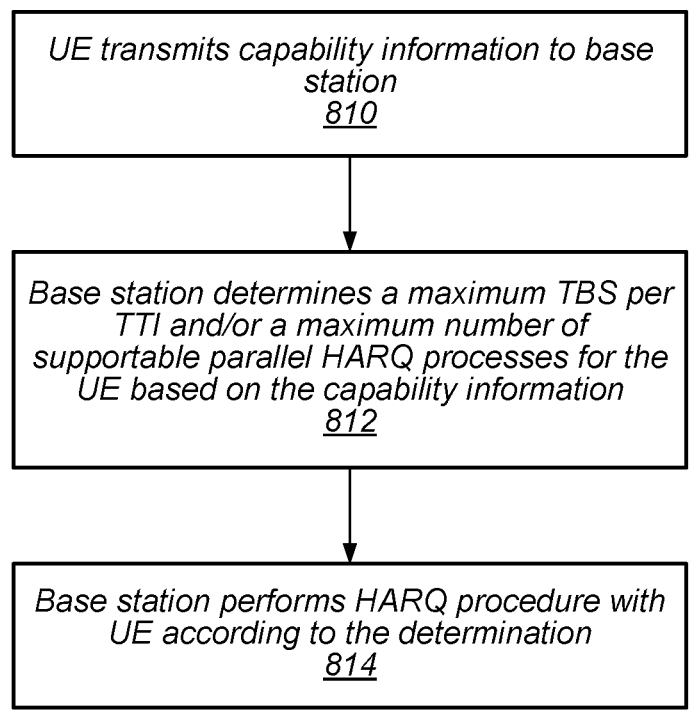
FIG. 8 is a flow diagram illustrating a method for a UE to transmit capability information to a base station, according to some embodiments.

FIG. 8—Flow Diagram for Transmission of Capability Information

FIG. 8 is a flowchart diagram illustrating an exemplary method by which a UE 106 transmits capability information to a base station, according to exemplary embodiments.

In some embodiments, at 810, the UE 106 transmits capability information to the base station 102. As explained in further detail below, the capability information may comprise a variety of different types of information, according to various embodiments. The capability information may be useable by the base station 102 to determine various performance characteristics of the UE 106.

At 812, the base station may determine capability specifications of the UE based on the capability information. In other words, the base station may determine a maximum transport block size (TBS) per TTI that can be processed by the UE based on the capability information. The maximum TBS per TTI may comprise two distinct metrics: the maximum number of DL-SCH transport block bits per TTI, as well as the maximum number of bits in a DL-SCH transport block per TTI. It is to be understood that the phrase "TBS per TTI" may be intended to refer to either, or both, of these quantities. The determined maximum TBS per TTI may be determined for a particular numerology to be used for an upcoming HARQ procedure with the UE. Alternatively, or in addition, the base station may determine capability specifications comprising a maximum number of supportable parallel HARQ processes for the UE based on the capability information. The maximum number of supportable parallel HARQ processes may likewise be determined for a particular numerology to be used for the upcoming HARQ procedure with the UE.

At 814, the base station may initiate a HARQ procedure with the UE according to the determination. In some embodiments, the base station may perform the HARQ procedure according to the numerology used to determine the maximum TBS per TTI and/or to determine the maximum number of supportable parallel HARQ processes of the UE. The TBS per TTI implemented for the initiated HARQ procedure, and/or the number of parallel HARQ processes employed for the HARQ procedure, may be set by the base station based on the determined maximum TBS per TTI and the determined maximum number of supported parallel HARQ processes, respectively.

UE Category Definitions Based on Reference Numerology

The maximum supportable transport block size per TTI and the associated processing delay of a UE in a HARQ process may depend on the numerology used for the process. In some embodiments, the UE may be configured to send capability information to the base station that indicates the UE's maximum supportable transport block size (TBS) per TTI and the associated processing delay based on a reference numerology (e.g. 15 kHz SCS, or another numerology). In other words, the UE may send capability information to the base station assuming that a predetermined reference numerology will be used for the communication.

In other embodiments, the capability information may comprise a category identifier, wherein the category identifier is associated with a particular value of maximum TBS per TTI and a particular processing delay for the reference numerology. In these embodiments, the base station may be preconfigured with a lookup table, wherein the base station can identify the maximum TBS per TTI and the processing delay associated with the category identifier.

In some embodiments, the capability information may additionally comprise information regarding a soft buffer capacity of the UE. Alternatively, the soft buffer capacity may be associated with the category identifier. The soft buffer capacity may be useable by the base station to determine a maximum number of parallel HARQ processes supportable by the UE, in some embodiments.

The base station, upon receiving the capability information, may scale the maximum TBS per TTI accordingly to support numerologies other than the reference numerology. For example, a UE that supports a maximum 1 TBS=600 k at peak throughput with SC S=15 kHz may only support a maximum TBS=300 k with SCS=30 kHz, due to hardware limitations. This can be understood because a 30 kHz numerology will have a TTI length that is half of that obtained from a 15 kHz numerology, so that a constant processing rate would be able to process half as many transport block bits in the 30 kHz numerology as in the 15 kHz numerology. Accordingly, if the base station is initiating a HARQ procedure with a numerology of 30 kHz SCS, and the reference numerology is 15 kHz SCS, the base station may scale the maximum TBS comprised within the capability information by a factor of ½ to compensate for the larger SCS. More generally, the maximum TBS per TTI (denoted by K) may be calculated according to the following equation:

$$K = K_{ref} \cdot \Delta f_{ref} / \Delta f \qquad (2)$$

Here Kref is the maximum TBS per TTI contained in the capability information received from the UE assuming the reference numerology, Δfref is the bandwidth of the reference numerology, and Δf is the bandwidth of the numerology to be used by the base station in the DL HARQ procedure. The base station may use equation (2) to determine the maximum TBS per TTI to use in the HARQ procedure if it is desired that a numerology other than the reference numerology be employed.

In some embodiments, the base station may be additionally configured to determine the maximum TBS required to support a particular number of HARQ processes. Specifically, the maximum TBS per TTI required for a number N of HARQ processes may be given by the following equation:

$$K = K_{ref} \cdot N_{ref} / N \qquad (3)$$

Here N is the number of parallel HARQ processes to be employed, and Nref is the number of parallel HARQ processes supported in the reference numerology. In these embodiments, Nref, the number of HARQ processes supported with the reference numerology, can be computed by the following equation:

$$N_{ref} \geq \frac{T_{UE\_ref} + T_{gNB\_ref}}{TTI_{ref}} \qquad (4)$$

Here $T_{UE\_ref}$ is the processing time of the UE in the reference numerology, $T_{gNB\_ref}$ is the processing time of the base station in the reference numerology, and $TTI_{ref}$ is the transmission time interval in the reference numerology. For example, if Nref is 8 parallel HARQ processes, and it is desired by the base station to operate 16 parallel HARQ processes, the base station may determine that a maximum TBS per TTI of ½ that received from the UE in the capability information may be supported by the UE. In general, if a base station desires to use a different number of parallel HARQ processes than the reference number of HARQ processes, it may determine the maximum TBS per TTI to use for the operation based on equations 3 and 4. Additionally, in some embodiments, the base station may verify that the maximum TBS per TTI and the number of parallel HARQ processes determined from Equations (2)-(4) satisfy the total soft channel bit constraints of the UE. In the other words, the UE's capability information may have informed the base station of the UE's soft buffer capacity, and the base station may make its determination regarding maximum TBS per TTI and number of parallel HARQ processes in order to not exceed the UE's soft buffer capacity for the HARQ procedure.

In equation 4, it is noted that the transit time of the UL and DL HARQ communications are neglected in determining the overall HARQ RTT, as negligible compared to the processing times, which are usually much longer. However, other embodiments may include these transit times in computing the maximum supportable number of parallel HARQ processes. It is further noted that, in many cases, N will evaluate to a non-integer value. In these cases, N may be rounded down to the nearest integer value.

In some embodiments, the UE may determine that such scaling according to numerology is supported prior to sending the capability information. In other words, the UE may need to be configured such that the scaling of maximum supported TBS per TTI with the numerology used and the number of HARQ processes used conforms with the linear scaling implied by equations 2 and 3.

In some embodiments, a separate reference numerology may be used for each of a plurality of different frequency bands. As one specific example, 15 kHz may be used as the reference numerology for sub-6 GHz, and 120 kHz may be used for above 6 GHz. Any other combination of different reference numerologies for different pluralities of frequency bands may also be used, as desired.

In some embodiments, the base station may be configured to initiate a HARQ procedure with the UE with a particular numerology according to the maximum TBS per TTI and/or the maximum supportable number of parallel HARQ processes determined.

UE Category Definition Based on Maximum Throughput

In some embodiments, the UE may be configured to send capability information to the base station that indicates a maximum throughput (for example, in bps) and an associated processing delay (e.g., in sec) for the UE, wherein the capability information is independent of the numerology used. As one nonlimiting example, the capability information could state that the UE can process a maximum throughput of 300 Mbps, with an associated delay of 2 ms. In exemplary embodiments, the UE may have a maximum throughput and associated processing delay that is relatively insensitive to the particular numerology that is used.

In other embodiments, the capability information may comprise a category identifier, wherein the category identifier is associated with a particular value of maximum throughput and a particular processing delay. In these embodiments, the base station may be preconfigured with a lookup table, wherein the base station can identify the maximum throughput and the processing delay associated with the category identifier.

In some embodiments, the capability information may additionally comprise information regarding a soft buffer capacity of the UE. Alternatively, the soft buffer capacity may be associated with the category identifier. The soft buffer capacity may be useable by the base station to determine a maximum number of parallel HARQ processes supportable by the UE, in some embodiments.

In some embodiments, upon receiving the capability information, the base station may calculate the maximum supportable TBS per TTI based on the numerology to be used for the HARQ procedure and the maximum throughput of the UE according to the following equation $$K = R \cdot TTI \qquad (5)$$

Here K is the maximum TBS per TTI, R is the maximum throughput obtained from the capability information, and TTI is the TTI length associated with the numerology used for the particular HARQ procedure (for example, a 15 kHz numerology is associated with a 1 ms TTI).

In some embodiments, upon receiving the capability information, the base station may calculate the maximum supportable number of parallel HARQ processes for communication with the UE based on the numerology used, the UE processing delay, and the processing delay of the base station according to the following equation:

$$N \geq \frac{T_{UE} + T_{gNB}}{TTI} \qquad (6)$$

Here N is the supportable number of parallel HARQ processes for communication with the UE, $T_{UE}$ is the processing delay of the UE received in the capability information, $T_{gNB}$ is the processing time of the base station, and TTI is the TTI length associated with the numerology used for the particular HARQ procedure. Additionally, in some embodiments, the base station may make sure that any TBS per TTI and number of parallel HARQ processes determined from equations (5) and (6) will also satisfy the total soft channel bits constraints, which may have been reported by the UE as part of the UE capability information.

In equation 6, it is noted that the transit time of the UL and DL HARQ communications are neglected in determining the overall HARQ RTT, as negligible compared to the processing times, which are usually much longer. However, other embodiments may include these transit times in computing the maximum supportable number of parallel HARQ processes. It is further noted that, in many cases, N will evaluate to a non-integer value. In these cases, N may be rounded down to the nearest integer value.

In some embodiments, the base station may be configured to initiate a HARQ procedure with the UE with a particular numerology according to the maximum TBS per TTI and/or the maximum supportable number of parallel HARQ processes determined.

UE Category Definitions Based on Exhaustive Categorization

In some embodiments, the performance of a UE device may not scale linearly with the numerology used. In other words, as one nonlimiting example, for some UE devices, performing a HARQ procedure with a SCS of 30 kHz instead of 15 kHz may not result in exactly half, or sufficiently close to half (i.e., to within a predetermined error tolerance), of the maximum TBS per TTI. For example, for some UE devices, doubling the SCS may result in the maximum TBS per TTI being reduced by ⅓, or ¼. For these devices, the capability information described in previous embodiments may not communicate the functionality of the UE for various numerologies to the base station with sufficient accuracy. In these cases, it may be advantageous for the UE to communicate separate capability information to the base station for each numerology supported by the UE device. In other words, the UE may communicate to the base station its maximum TBS per TTI and associated processing delay for each numerology separately. The UE may additionally communicate its soft buffer capacity to the base station, in some embodiments. An advantage of this method is that accurate capability information can be given to the base station even in the case of a nonlinear response of the UE to variable numerologies. An additional advantage is that the base station is not required in these cases to perform calculations for the particular numerology used in the HARQ procedure. A disadvantage of this method is that the capability information communicated by the UE will be considerably more complex. For example, in the case where there are 6 supported numerologies, the capability information will be 6 times more complicated than the legacy methods listed in FIG. 7 for LTE.

The following numbered paragraphs describe additional embodiments of the invention.

In some embodiments, a user equipment device (UE), comprises an antenna configured to perform cellular communications with a base station, a radio operably coupled to the antenna, and a processing element operably coupled to the radio. The UE may be configured to transmit capability information to the cellular base station, and receive communications from the base station, wherein the communications comprise a number of parallel HARQ processes, wherein the number of parallel HARQ processes is determined by the base station based on the capability information transmitted by the UE.

In some embodiments, the communications received from the base station use a first subcarrier spacing (SCS), and the number of parallel HARQ processes is further determined by the base station based on the first SCS.

In some embodiments, the communications received from the cellular base station utilize a maximum packet size that can be transmitted on each transmit time interval (TTI) and the maximum number of parallel HARQ processes that are supported in the communications, wherein the maximum packet size and the maximum number of parallel HARQ processes used in the received communications from the base station are determined by the base station based on the capability information transmitted by the UE.

In some embodiments, the user equipment is configured to transmit capability information to the cellular base station, and receive communications from the cellular base station using a first subcarrier spacing (SCS), wherein the communications comprise one or more transmissions with a first transport block size (TBS) per transmission time interval (TTI), wherein the first TBS is determined by the base station based on the first SCS and the capability information transmitted by the UE.

In some embodiments, the capability information comprises a maximum number of bits per second that can be processed by the UE and an associated processing delay.

In some embodiments, the capability information comprises a maximum supportable TBS per TTI of the UE and an associated processing delay for a reference subcarrier spacing (SCS).

In some embodiments, reference subcarrier spacing is chosen based on a frequency band used for the communications received from the base station.

In some embodiments, the capability information comprises a maximum TBS per TTI supported by the UE and an associated processing delay for each of a plurality of subcarrier spacings.

In some embodiments, a UE is configured to transmit capability information to a cellular base station, the capability information comprising a maximum supportable transport block size (TBS) per transmission time interval (TTI) of the UE and an associated processing delay for a reference subcarrier spacing (SCS), and receive communications from the cellular base station based on the capability information.

In some embodiments, a UE is configured to transmit capability information to the cellular base station, the capability information comprising a maximum number of bits per second that can be processed by the UE and an associated processing delay, and receive communications from the cellular base station based on the capability information.

In some embodiments, the processing delay is based on a subcarrier spacing received by the UE.

In some embodiments, the UE receives cellular communications from the base station according to different subcarrier spacings.

In some embodiments, a cellular base station comprises an antenna configured to perform cellular communications with a plurality of user equipments (UEs), a radio operably coupled to the antenna, and a processing element operably coupled to the radio. In these embodiments, the antenna, radio, and processing element may be configured to receive capability information from a user equipment device (UE), determine a maximum transport block size (TBS) per transmission time interval (TTI) supported by the UE based on the capability information and a subcarrier spacing (SCS), and transmit communications to the UE according to the determined TBS per TTI and the SCS.

In some embodiments, the antenna, radio, and processing element of the base station may be configured to receive capability information from a user equipment device (UE), determine a number of parallel hybrid automatic repeat requests (HARQs) supported by the UE based on the capability information and a subcarrier spacing (SCS), and transmit communications to the UE according to the supported number of parallel HARQs and the SCS.

In some embodiments, the capability information received comprises a maximum number of bits per second that can be processed by the UE and an associated processing delay.

In some embodiments, the capability information received comprises a maximum supportable TBS per TTI of the UE and an associated processing delay for a reference subcarrier spacing (SCS).

In some embodiments, the reference subcarrier spacing is chosen based on a frequency band used for the communications transmitted by the base station.

In some embodiments, the capability information received comprises a maximum TBS per TTI supported by the UE and an associated processing delay for each of a plurality of subcarrier spacings.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a radio;
a non-transitory computer-readable memory medium; and
a processor coupled to the radio and the non-transitory computer-readable memory medium, wherein the processor is configured to cause the UE to:
transmit capability information to a cellular base station, wherein the capability information comprises a category identifier, wherein the category identifier is associated with a particular processing delay for a first numerology, wherein respective processing delays for other numerologies are scaled non-linearly from the particular processing delay for the first numerology; and
receive communications from the cellular base station using a first subcarrier spacing (SCS), wherein the communications comprise one or more transmissions with a first transport block size (TBS) per transmission time interval (TTI), wherein the first TBS is based on the first SCS and the capability information transmitted by the UE.

2. The UE of claim 1, wherein the capability information comprises a maximum number of bits per second that can be processed by the UE and an associated processing delay.

3. The UE of claim 1, wherein the capability information comprises a maximum supportable TBS per TTI of the UE, and an associated processing delay, for a reference SCS.

4. The UE of claim 3, wherein the reference SCS is chosen based on a frequency band used for the communications received from the cellular base station.

5. The UE of claim 1, wherein the capability information comprises a maximum TBS per TTI supported by the UE and an associated processing delay for each of a plurality of subcarrier spacings.

6. The UE of claim 1, wherein the capability information comprises a processing delay associated with communications using the first SCS.

7. A cellular base station, comprising:
an antenna configured to perform cellular communications with a plurality of user equipment devices (UEs);
a radio operably coupled to the antenna; and
a processing element operably coupled to the radio;
wherein the antenna, radio, and processing element are configured to:
receive capability information from a user equipment device (UE), wherein the capability information comprises a category identifier, wherein the category identifier is associated with a particular processing delay for a first numerology, wherein respective processing delays for other numerologies are scaled non-linearly from the particular processing delay for the first numerology;
determine, based on the capability information and a first subcarrier spacing (SCS), capability specifications of the UE, the capability specifications comprising a maximum transport block size (TBS) per transmission time interval (TTI) supported by the UE for the first SCS; and
transmit communications to the UE according to the determined capability specifications and the first SCS.

8. The cellular base station of claim 7, wherein the capability information comprises a maximum number of bits per second that can be processed by the UE and an associated processing delay.

9. The cellular base station of claim 7, wherein the capability information comprises a maximum supportable TBS per TTI of the UE, and an associated processing delay, for a reference subcarrier spacing (SCS).

10. The cellular base station of claim 9, wherein the reference SCS is based on a frequency band used for the communications transmitted by the cellular base station to the UE.

11. The cellular base station of claim 7, wherein the capability information comprises a maximum TBS per TTI supported by the UE, and an associated processing delay, for each of a plurality of subcarrier spacings.

12. The cellular base station of claim 7, wherein the communications transmitted by the cellular base station utilize a maximum packet size that can be transmitted on each transmit time interval (TTI) and a maximum number of parallel hybrid automatic repeat request (HARQ) processes that are supported in the communications, wherein the maximum packet size and the maximum number of parallel HARQ processes used in the communications transmitted by the cellular base station are determined by the cellular base station based on the capability information received from the UE.

13. The cellular base station of claim 7, wherein the cellular base station is further configured to:
  transmit communications to the UE according to a plurality of different subcarrier spacings.

14. A method for operating a cellular base station, the method comprising:
  receiving capability information from a user equipment device (UE), wherein the capability information comprises a category identifier, wherein the category identifier is associated with a particular processing delay for a first numerology, wherein respective processing delays for other numerologies are scaled non-linearly from the particular processing delay for the first numerology,
  determining, based on the capability information and a first subcarrier spacing (SCS), capability specifications of the UE, the capability specifications comprising a maximum transport block size (TBS) per transmission time interval (TTI) supported by the UE for the first SCS; and
  transmitting communications to the UE according to the determined capability specifications and the first SCS.

15. The method of claim 14, wherein the capability information comprises a maximum number of bits per second that can be processed by the UE and an associated processing delay.

16. The method of claim 14, wherein the capability information comprises a maximum supportable TBS per TTI of the UE, and an associated processing delay, for a reference subcarrier spacing (SCS).

17. The method of claim 16, wherein the reference SCS is based on a frequency band used for the communications transmitted by the cellular base station to the UE.

18. The method of claim 14, wherein the capability information comprises a maximum TBS per TTI supported by the UE, and an associated processing delay, for each of a plurality of subcarrier spacings.

19. The method of claim 14,
  wherein the communications transmitted by the cellular base station utilize a maximum packet size that can be transmitted on each transmit time interval (TTI) and a maximum number of parallel hybrid automatic repeat request (HARQ) processes that are supported in the communications, wherein the maximum packet size and the maximum number of parallel HARQ processes used in the communications transmitted by the cellular base station are determined by the cellular base station based on the capability information received from the UE.

20. The method of claim 14, further comprising:
  transmitting communications to the UE according to a plurality of different subcarrier spacings.

* * * * *